United States Patent [19]

Fries et al.

[11] 4,426,318

[45] Jan. 17, 1984

[54] SUPPORTED POLYETHYLENE POLYMERIZATION CATALYSTS UTILIZING SUBSTITUTED POLYSTYRENE RESINS

[75] Inventors: Richard W. Fries, Joliet; Charles K. Buehler, Naperville, both of Ill.

[73] Assignee: Northern Petrochemical Company, Omaha, Nebr.

[21] Appl. No.: 446,057

[22] Filed: Dec. 1, 1982

[51] Int. Cl.$^3$ .............................. C08F 4/02; C08F 4/64
[52] U.S. Cl. .................................. 502/154; 526/124; 502/402; 502/439
[58] Field of Search ........................ 252/429 B, 431 R

[56] References Cited

U.S. PATENT DOCUMENTS

| | | |
|---|---|---|
| 3,219,589 | 11/1965 | Burke et al. .......................... 252/429 |
| 3,396,155 | 8/1968 | Delbouille et al. .............. 260/80.78 |
| 3,595,849 | 7/1971 | Nakano et al. ...................... 260/93.7 |
| 4,021,599 | 5/1977 | Kochnar et al. ............. 252/429 B X |
| 4,147,664 | 4/1979 | Pomogailo et al. ............. 252/429 B |
| 4,161,462 | 7/1979 | Bocharov et al. .............. 252/429 B |
| 4,329,255 | 5/1982 | Beach et al. ..................... 252/429 B |

*Primary Examiner*—Patrick Garvin
*Attorney, Agent, or Firm*—Donald F. Haas

[57] ABSTRACT

A supported catalyst for the polymerization and copolymerization of ethylene which comprises a reduced tetravalent titanium compound, an aluminum alkyl and a substituted polystyrene resin support. After treatment of the polymer with magnesium salts, either the titanium component or the aluminum component is prereacted with the substituent groups of the polystyrene resin which are selected from the group consisting of hydroxymethyl, chloromethyl, and sulphonate.

3 Claims, No Drawings

SUPPORTED POLYETHYLENE POLYMERIZATION CATALYSTS UTILIZING SUBSTITUTED POLYSTYRENE RESINS

BACKGROUND OF THE INVENTION

The present invention relates to a catalyst for use in the preparation of ethylene homopolymers and copolymers by means of a catalyst system which contains:
 (1) reduced titanium tetrachloride or other tetravalent titanium compound, and
 (2) an aluminum alkyl of the formula

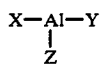

where X and Y are each alkyl of not more than 8, especially not more than 4, carbon atoms, and Z is chlorine or alkyl of not more than 8, especially not more than 4, carbon atoms.

More specifically, the invention relates to complex catalysts wherein a magnesium salt-modified polymeric material is utilized as a support for the two components described above in order to increase the effective surface area of the catalyst and thereby its activity and productivity.

The use of polymeric materials as catalyst supports has been known for some time. Belgium Pat. No. 552,550 discloses the use of preformed polyethylene as an inert support. British Pat. No. 834,217 discloses the use of a cellulose resin. U.S. Pat. No. 3,396,155, issued Aug. 6, 1968, discloses the use of vinyl alcohol copolymers as support materials wherein the titanium compound is substituted at the hydroxyl groups in the chain. Nitrogen-containing polymers having amino-, imino-, imido-, urethane-, nitrile-, or nitro-groups are disclosed in Belgium Pat. No. 706,659 and sulfur-containing polymers, such as polysulphone, are disclosed in Belgium Pat. No. 690,008. Carbon chain polymers having fragments containing elements with unshared pairs of electrons, such as nitrogen, oxygen, sulfur, and phosphorous, are disclosed in Inventors Certificate of the U.S.S.R. No. 420,330. Polymer carriers containing groups such as $>C=O$, $>=N$, and $C=N$ are disclosed in Belgium Pat. No. 716,375. Finally, U.S. Pat. No. 4,147,664, issued Apr. 3, 1979, discloses polymeric catalysts support materials which contain a substituted polymeric fragment. The aluminum component or the titanium component is reacted with the substituted fragment and thus is attached to the polymer chain. The substituents disclosed are —OH, —NHR, —SR, —COCH₃, —CH₂OH,

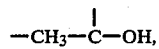

—CH₂NHR, —CH₂SH, —COOH, —OCOCH₃, —COOCH₃, —C≡N, —N(R)₂, —SO₂R, —SOR, —CH₂S—CH₂CH=CH₂, —CH₂—NH—CH₂CH=CH₂, —CH₂—SO₂—CH=CH₂ and ring compounds containing nitrogen, wherein R is hydrogen, methyl, ethyl, phenyl, or CH₂=CH—.

In all of the support materials described in the above prior art patents, the aluminum or titanium compounds are attached either directly to the polymer chain or through a substituent group which is itself directly grafted onto the polymer chain. In the present invention, the use of a polystyrene resin which contains substituent groups attached to the phenyl groups of the polystyrene chain provides advantages over the above in terms of ability to bind magnesium ions which form a polymeric ionic magnesium support for the attachment of titanium to the support.

SUMMARY OF THE INVENTION

The present invention relates to a polymerization catalyst for the polymerization and copolymerization of ethylene which comprises:
 (1) reduced titanium tetrachloride or other tetravalent titanium compound, and
 (2) an aluminum alkyl of the formula

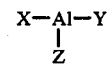

where X and Y are each alkyl of not more than 8, especially not more than 4, carbon atoms, and Z is chlorine or alkyl of not more than 8, especially not more than 4, carbon atoms, and
 (3) a catalyst support material comprising a substituted polystyrene resin wherein the substituent groups are selected from the group consisting of hydroxymethyl, chloromethyl, and sulphonate, and the support material has been treated with a magnesium salt to form an active support. The substituent groups are substituted on the phenyl rings of the polystyrene resin.

DETAILED DESCRIPTION OF THE INVENTION

The polymerization process as such can—taking into account its characterizing feature—be carried out in virtually all relevant conventional technological embodiments, i.e., as a batchwise, cyclic or continuous process, which may, for example, be a suspension polymerization process, solution polymerization process, or gas phase polymerization process. The technological embodiments mentioned are well-known from the literature and from industrial practice and do not require more detailed comments. For completeness, it should be noted that in the process according to the invention, the molecular weights of the polymers can be regulated by the relevant conventional measures, e.g., by means of regulators, especially hydrogen.

Regarding the materials used in the novel catalyst system, the following details should be noted:

The titanium compound employed can be a tetravalent titanium halide or another tetravalent titanium compound. Compounds which have proved very suitable are, for example, titanium tetrachloride and titanium tetravalent alkoxides. The appropriate titanium halides and alkoxides are commercially available and hence do not require further comment. The titanium compound should be reduced with hydrogen, aluminum, or an aluminum-organic compound.

Suitable aluminum alkyls of the stated formula are again the relevant conventional compounds of this formula. These are so well-known from the literature and from industrial practice that they do not require more detailed discussions here. Particularly important examples are triethylaluminum, diethylaluminum chloride, and triisobutylaluminum.

The support material is comprised of a substituted polystyrene resin. Methods for the manufacture of polystyrene are well-known and need not be discussed in any further detail here. These resins contain substituent groups selected from the group consisting of hydroxymethyl, chloromethyl, and sulphonate. Such substituent groups can be added to the phenyl ring of the polystyrene chain by standard reactions and these resins are commercially available. The resins must be modified by treatment with a magnesium salt to "activate" the support material.

The above polymeric support material is used by first reacting it with a magnesium salt, for example, magnesium carbonate, and then reacting it with either the aluminum component or the titanium component such that the reacted component is attached to the polystyrene support material through the substituent group. This co-called prereaction can be carried out by simply treating the support material with a magnesium salt, drying the solid, and then treating it with a tetravalent titanium compound or with an organoaluminum compound. Finally, the prereacted support material containing magnesium and the first component are combined with the other catalyst component in the polymerization reactor or before to complete the polymerization catalyst.

The catalyst of the present invention utilizing substituted polystyrene resin as a support material provides significant advantages in the polymerization and copolymerization of alpha olefins. First, the support material provides increased surface area for contact between the titanium and aluminum components of the catalyst without the necessity for expensive and time-consuming milling processes such as are disclosed in U.S. Pat. Nos. 4,120,823, 4,154,699, and 4,154,700. Second, the use of substituent groups which do not contain chlorine provides an advantage over catalysts using inorganic support materials such as magnesium chloride if magnesium salts such as magnesium carbonate and if substituents other than chloromethyl are used. Third, the content of reactive groups on the support polymer determine the number of active sites on the catalyst.

EXAMPLES

Example I

Thirty (30) grams of Dowex ® 50-H+ sulphonated polystyrene resin was taken up in 150 ml. of water. To this was added 15.0 grams of magnesium carbonate in basic form. The slurry was stirred for 1 hour with evolution of gas. The resin was filtered with and washed with 1% MgCl$_2$ in water. The resin was taken up in 150 ml. of isopropanol and stirred gently for 1 hour. The resulting treated resin was filtered, washed with isopropyl alcohol and dried in vacuo.

10.0 grams of the dried resin was added to 10 ml. of heptane and 5 ml. of TiCl$_4$ under an inert atmosphere in a dry box. The resin turned bright yellow with some evolution of gas. The TiCl$_4$ was washed away with six 15 ml. portions of heptane. The resin was then retreated with 5 ml. TiCl$_4$ and allowed react for 2 days. The resulting catalyst was washed with six 15 ml. of heptane and dried under nitrogen.

The catalyst was evaluated with ethylene in a heptane slurry process as follows: 2.5 mls. of 0.5 molar methylpara-toluate in heptane, 7 ml. of 25% diethylaluminum chloride in heptane, and 7 ml. of 25% triethylaluminum in heptane were added to 1,300 ml. of heptane under a nitrogen atmosphere at 74° C. 1.0 grams of the above catalyst was added to this solution. Ethylene was bubbled into the reactor at a rate of approximately 50 liters per hour. After 3 hours, the ethylene flow was terminated, the reactor was cooled to room temperature, and 100 ml. of methanol was added to destroy the catalyst. The reaction solution was treated by filtration and produced 13.1 grams of high density polyethylene polymer.

Example II

Seven (7) grams of magnesium carbonate in basic form was added to 25 grams of Biorad cation exchange sulphonated polystyrene resin AGMP50 in 100 ml. of water. The mixture was stirred until evolution of gas had ceased and then it was allowed to settle overnight. The resin was filtered, washed with methanol, washed with isopropanol and dried in vacuo.

Two (2) ml. of ethyl benzoate and 50 ml. of titanium tetrachloride were added to the above resin in 400 ml. of heptane under a nitrogen atmosphere with stirring. The mixture was heated to 74° for 1 hour then 85° for 1 more hour. The pale yellow solid was separated and washed with six 300 ml. portions of heptane, dried in vacuo, and stored under nitrogen.

0.51 grams of the above catalyst were used to polymerize ethylene at 74° C. for 3 hours as described in Example I. In this case, 9 ml. of triethylaluminum and 2.5 ml. of methylpara-toluate were used to activate the catalyst. No diethylaluminum chloride was used. 4.3 grams of high density polyethylene were obtained.

Example III

A support was prepared by mixing 25 grams of Dowex ® 50-H+ sulphonated polystyrene resin in 250 ml. of water with 50 grams of magnesium carbonate in basic form. The slurry was gently stirred for 1 hour and filtered and washed several times with deionized water. The slurry was filtered and dried in vacuo.

Five (5) ml. of titanium tetrachloride was added to 1 gram of the support material. The mixture was stored overnight and the solid was washed with five 10 ml. portions of heptane. The catalyst was dried under nitrogen.

The catalyst was used to polymerize ethylene in the heptane slurry as described above. In this case 650 ml. of heptane was used, the temperature was 70° C. and 25% triisobutylaluminum was used as the only catalyst activator. 20.2 grams of high density polyethylene were obtained.

We claim:
1. A supported polymerization catalyst for the polymerization and copolymerization of ethylene which comprises:
(1) a reduced tetravalent titanium compound,
(2) an aluminum alkyl of the formula

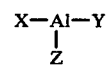

where X and Y are each alkyl of not more than 8 carbon atoms, and Z is chlorine or alkyl of not more than 8 carbon atoms, and
(3) a polystyrene resin which is substituted on the phenyl rings thereof wherein the substituent groups are selected from the group consisting of hydroxymethyl, chloromethyl, and sulphonate, and wherein the resin is modified by treatment with magnesium salts prior to treatment with the titanium compound.

2. The catalyst of claim 1 wherein either the titanium compound or the aluminum alkyl has been prereacted with the polystyrene support material prior to the addition of the other component.

3. The catalyst of claim 1 wherein the titanium compound is titanium tetrachloride.

* * * * *